United States Patent
Haje

(10) Patent No.: US 6,988,869 B2
(45) Date of Patent: Jan. 24, 2006

(54) TURBINE INSTALLATION, ESPECIALLY STEAM TURBINE INSTALLATION

(75) Inventor: Detlef Haje, Bottrop (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/670,804

(22) Filed: Sep. 25, 2003

(65) Prior Publication Data

US 2004/0057826 A1 Mar. 25, 2004

Related U.S. Application Data

(63) Continuation of application No. PCT/EP02/03555, filed on Mar. 28, 2002.

(30) Foreign Application Priority Data

Apr. 11, 2001 (EP) ............................ 01109035

(51) Int. Cl.
*F01D 25/28* (2006.01)

(52) U.S. Cl. .................. 415/104; 415/108; 415/119; 415/134; 415/142; 415/229

(58) Field of Classification Search .............. 415/126, 415/108, 104, 229, 142, 119, 134, 211.2
See application file for complete search history.

(56) References Cited

U.S. PATENT DOCUMENTS

| | | | |
|---|---|---|---|
| 2,933,893 A | * | 4/1960 | Blyth et al. ............... 415/126 |
| 3,464,654 A | | 9/1969 | Kolesar |
| 3,837,164 A | * | 9/1974 | Carr ........................... 415/126 |
| 4,204,804 A | | 5/1980 | Woodger |
| 4,405,283 A | * | 9/1983 | Owsianny ................ 415/230 |
| 5,051,061 A | | 9/1991 | Meylan |
| 5,330,320 A | * | 7/1994 | Mansson ................... 415/129 |
| 6,092,986 A | * | 7/2000 | Oeynhausen et al. ....... 415/104 |

FOREIGN PATENT DOCUMENTS

| | | |
|---|---|---|
| DE | 1 216 322 | 5/1966 |
| DE | 35 22 916 | 1/1987 |
| DE | 196 29 933 | 9/1997 |
| EP | 0 601 825 | 6/1994 |
| GB | 1 145 612 | 3/1969 |

* cited by examiner

*Primary Examiner*—Edward K. Look

(57) ABSTRACT

The invention relates to a turbine installation, especially a steam turbine installation. The inventive turbine installation comprises at least two partial turbines, each of the partial turbines having a rotor disk that extends along the main axis. Said rotor disks are rigidly interlinked to a shafting. At least one of the partial turbines has an inner housing that concentrically encloses the rotor disk and that is mounted so as to be axially displaceable in a bearing area. To allow for an axial displacement a push element transmits the axial force and is linked with the inner housing. In order to allow the inner housing to be axially displaced as easily as possible, the bearing area has a bearing device with a static friction and/or sliding friction that is so low that the axial misplacement that spontaneously occurs when the static friction is overcome during displacement of the inner housing is smaller 2 mm.

20 Claims, 5 Drawing Sheets

TURBINE INSTALLATION, ESPECIALLY STEAM TURBINE INSTALLATION

CROSS REFERENCE TO RELATED APPLICATIONS

This application is a continuation of International Application No. PCT/EP02/03555, filed Mar. 28, 2002 and claims the benefit thereof. The International Application claims the benefits of European application No. 01109035.4 EP, filed Apr. 11, 2001, both applications are incorporated by reference herein in their entirety.

FIELD OF INVENTION

The invention relates to a turbine system, especially a steam turbine system, with at least two turbine stages. Each turbine stage has a shafting extending along a main axis and consists of several turbine rotors rigidly connected to each other. At least one of the turbine stages has an inner casing essentially concentrically enclosing the turbine rotors, with the inner casing being supported in an axially-displaceable manner in a bearing area. A thrust element transmitting an axial force and connected to the inner casing is provided for axial displacement of the inner casing.

BACKGROUND OF INVENTION

DE 35 22 916 A1 describes a turbine set with at least one outer casing and a low-pressure turbine stage with an inner casing coaxial to it and with at least one coaxial high-pressure and/or medium-pressure turbine stage arranged upstream of the low-pressure turbine stage. The shafts of the turbine stages are rigidly connected together to form a shafting. Upstream of the low-pressure turbine stage is an axial bearing for the shafting, that is the starting point of the axial shaft expansion and displacement. The inner casing is connected by means of thrust-transferring connecting rods to the end of an axial adjacent turbine stage casing mounted so that it can move axially, or to a turbine bearing casing. The connecting rods are passed out through a wall in the outer casing through a sealing element that enables limited transverse movement and allows for thermal expansion while at the same time providing a vacuum seal. A turbine bearing located before the low-pressure turbine stage defines a second reference plane that forms the starting point of the axial expansion and displacement of the turbine stage casing mounted on this turbine bearing and of the turbine stage casing connected to it. This causes an axial displacement of the shafting and of the turbine stage casing with practically the same axial expansion and in the same direction. This enables minimum axial play between adjacent rotor blade and stationary blade rims. The thrust transfer by means of the connecting rods takes place in the area of the thrust-transferring turbine bearing. Furthermore, a vacuum-tight passage of the connecting rods is structurally combined with a horizontal claw-bearing mounting of the inner casing of the low-pressure turbine stage, the claw-bearing mounting of the inner casing of the low-pressure turbine stage being horizontally moved by heat. The claw arms of the inner casing extend in a direction parallel to the axis of the shaft and their sliding supporting and guiding faces lie against the supports of the associated bearing casing. The fit of the sliding and guiding faces is realized by sliding and adjusting shims. The connecting rods are mechanically connected to the claw arms in the area of the turbine bearings, in particular a diaphragm seal for a vacuum-proof passage is connected by means of an outer annular flange to an end face of the outer casing of the low-pressure turbine stage and has a vacuum-tight connection to a turbine bearing casing section by means of an inner annular flange. The arrangement of the sealing elements between the seat faces at the outer casing end wall and the bearing casing, i.e. between parts with only a slight relative movement, means that the larger thermal displacements of the inner casing are decoupled from the sealing elements.

DE-AS-1 216 322 describes a steam or gas turbine with several coaxial turbine stages arranged one behind the other, the shafts of which are rigidly connected to each other, with at least one of their casings being axially displaceable and connected to a fixed turbine stage casing or bearing pedestal. The low-pressure casing of the turbine in each case consists of an outer and inner casing. The inner casing of the low-pressure turbine is connected to an adjacent turbine stage casing or bearing pedestal by a rod assembly that passes through the wall of the outer casing so as to form a steam-proof seal and enable movement due to heat. The rod assembly can be a single rod sealed in the outer casing wall by a bellows that flexes axially and radially. The rod assembly can also consist of three rods axially in line and connected to each other by hinged joints, the center one of which can move axially with a sliding fit in a sleeve in the outer casing wall. A rod assembly arrangement of this kind is designed to produce an axial displacement of the casing by means of which the axial play between the rotor and the casing is held as constant as possible. To change the magnitude of the axial play, it is possible to change the length of the rod assembly by changing its temperature. This change in temperature is brought about by an additional heat load on the rod assembly by means of steam or a liquid.

A change of this kind in the magnitude of the axial play, whereby hot steam is carried in a tube is described in GB-PS-1,145,612. An axially-expandable tube is connected to a rod at each of its end faces that in turn is secured to the inner casing of a low-pressure turbine stage. An axial displacement of the inner casing relative to a turbine rotor consists in each case of the particular expansion of the inner casing, the expansion of the connecting rods and the expansion of the expansion tubes. The thermal expansion of the interconnected inner casings starts from a fixed point arranged on the outer casing of the low-pressure turbine stage furthest upstream. This starting point of the thermal expansions of the inner casing differs from the starting point of the thermal expansions of the rotor, that is defined in a bearing lying further upstream. The expansion tubes are connected in each case via compensators to corresponding outer casings of the low-pressure turbine stages, so that the absolute expansion of the system from the inner casing and coupling rods must be taken by the compensators. To achieve a considerable constancy between the expansion of the turbine rotor and the system consisting of inner casings and connecting rods, the steam is to be applied to the expansion tubes in a preset manner. This steam must either be taken from the steam process or provided separately. It also requires a control and monitoring system by means of which the steam necessary to compensate for the axial play is applied to the expansion tubes in each case depending on the operating state of the steam turbines.

DE 196 29 933 C1 discloses a turbine system with a thrust element, as well as a thrust element. The turbine system has at least two turbine stages, each of which has a turbine rotor extending along a main axis and an inner casing housing the stationary blades. One inner casing can be displaced in the axial direction, with a thrust element that can be thermally expanded being used for an axial displacement. This has a first expansion component and a second expansion component that are connected together by means of a connecting component. This connecting component effects, mechanically and/or hydraulically, an axial displacement of the second expansion component that is greater than a thermal expansion and/or axial displacement of the first expansion component.

SUMMARY OF INVENTION

The object of the invention is to provide a turbine system whereby an axial play between the rotor and inner casing, particularly due to axial thermal expansion between turbine stages of the turbine system, remains below a specifiable value. This should enable a thrust element for transmitting an axial force to be used to further reduce the axial play, particularly when used on a large multi-casing turbine system with very heavy casings.

This object is achieved in accordance with the invention by a turbine system, especially a steam turbine system, with at least two steam turbines, with each turbine stage having a turbine rotor extending along a main axis, the turbine blades being rigidly connected to each other, with at least one of the turbine stages having an inner casing enclosing the turbine rotor, with the inner casing being supported, axially-displaceable, in a bearing area and with a thrust element transmitting an axial force for an axial displacement being provided that is connected to the inner casing, with the bearing area having a bearing device with a static friction so low that the spontaneously occurring axial offset when the static friction and sliding friction are overcome during the displacement of the inner casing is less than 2 mm.

Preferably, a bearing device is provided with a static friction that is so low that when the inner casing is displaced the axial offset that spontaneously occurs in overcoming the static friction is less than 1.5 mm, in particular less than 1 mm.

The invention is based on the knowledge that the measures previously known from the prior art for adjusting an axial play using thrust rods, particularly on multi-casing solid turbine systems have only a limited application because of the large axial forces to be transmitted for an axial displacement of an inner casing. With known systems, to transmit axial thermal expansion between turbine stages of a shafting to reduce the relative expansions between turbine rotors and inner casings of turbine stages, devices are used that transmit the casing expansions of the turbine stages axially arranged upstream to the downstream ones (thrust rods). The thermal axial expansion starting from an axial fixed point (axial bearing) of a shafting, however, results in axial displacements in the order of 40 to 50 mm for large turbine systems. So as not to have to allow fully for this axial expansion in the axial play, the casing of the turbine stage, particularly the low-pressure inner casing, is connected by means of thrust rods with an outer casing, particularly with the medium-pressure outer casing of a medium-pressure turbine stage. This causes a first inner casing to be displaced by the axial expansion of the upstream outer casing, for example a medium-pressure turbine stage outer casing, a second inner casing of further turbine stage by that of the outer casing and of the first inner casing etc. A reduction in the relative displacement between the turbine rotors and the inner casing is thus achieved. Up to now, the inner casing was supported on massive sliding plates that could be axially displaced with the minimum coefficient of friction. Because of the high reliability requirements and long operating durations of power station turbines, it is of course necessary for operating safety reasons to apply coefficients of friction of sliding plates for this that are greater than the original initial coefficients of friction. The design of the thrust elements transmitting the axial force therefore must allow for high design forces, e.g. static friction at the inner casing support where there is a deterioration in the coefficient of friction between the sliding plate and contact surface. This requires the thrust rods and the components used to transmit the force to be of solid construction, such as for example supports and bearing casings, and also requires a force transmission which is as direct as possible.

The invention is based on the consideration that the friction forces to be used for a multi-casing solidly-constructed turbine system become so great that the limit of realizability and reliable use of thrust elements to transmit axial forces, for example in the form of thrust rods, is reached. A disadvantage where the necessary high design forces are used is the considerably deformation of the thrust elements that occurs before the static friction is overcome in axially displacing the inner casing. This deformation can, depending on the operating condition, occur as an axial compression or expansion of the thrust element, i.e. in both directions of the turbine rotor extending along the main axis. For example where a thrust rod is used as a thrust element transmitting an axial force, it is resiliently compressed or extended. These elongative or compressive deformations must be allowed for in the design of the axial play and lead to an increase in the amount of axial play required. This in turn requires a greater clearance between the rotor blades and stationary blades of a turbine stage, that can then even mean that a stage of the turbine stage at the axial end of a shafting has to be omitted, resulting in a substantial efficiency disadvantage. Furthermore in the case of self-supporting blades with expansion slopes an additional radial play is necessary due to the axial clearance requirement, which also causes significant loss of efficiency due to gap losses.

By means of this invention, the serious disadvantages of the previously known solutions are now overcome for the first time. Advantageously, a turbine system with a thrust element that transmits an axial force for axial displacement, including for multi-casing solidly-constructed turbine systems with very heavy casings, is thus achieved. With the concept of the invention, the bearing device in the bearing area is designed in such a way that the minimum static friction is achieved. Low static friction also means low sliding friction because the sliding friction is typically less than the static friction. The axial offset that occurs spontaneously during a displacement is thus limited to a predetermined value. A spontaneous breakaway due to the relaxation of a deformed thrust element is thus largely prevented because, due to the almost complete removal or substantially reduction of the deformation energy of the thrust element, the axial displacement forces to be applied are substantially reduced compared with conventional solutions. The new bearing concept of the invention also means that an expansion transmission (thermal and/or mechanical pretension) is allowed for, which achieves an advantageous reduction in the axial play to be provided for the turbine system.

Advantageously, a lighter axial displaceability of the inner casing due to the relatively simple design measures is guaranteed by the proposed solution. Therefore the design of the thrust elements, e.g. thrust rods for transmission of the axial force, and their connection to the inner casing, can be less solid. This results in cost savings with regard to the use of materials and the selection of materials for the thrust elements transmitting the axial force. In addition to these structural advantages, the deformations of the thrust elements affecting the axial play are clearly reduced at the same time and in a most favorable case, where there is a correspondingly lower static friction of the bearing, can even be completely absent.

These measures to reduce axial play also increase the efficiency of the turbine system, with a large turbine system being made up of a number of turbine stages.

In a particularly advantageous embodiment, the bearing device is designed to be free of static friction. Compared with the conventional concept of a sliding plate with a sliding fit subject to friction, particularly static friction, the design of the bearing device as a bearing device free of static friction is clearly superior. A spontaneous breakaway during axial displacement is thus largely precluded. Free of static friction means in this connection largely without static friction, i.e. the bearing device has no, or only very little, static friction. Thus, it can be advantageously ensured that no spontaneously occurring axial offset takes place when the inner casing is displaced, because no, or very little, static friction has to be overcome. In particular, it can be guaranteed that any axial offset that does possibly occur will certainly be less than 2 mm.

Advantageously, the bearing device has a hydrostatic bearing supplied with a pressurized operating medium, particularly oil under pressure, with a sliding film being formed. A particular characteristic of a hydrostatic bearing is its very low static friction. The hydrostatic bearing advantageously has hardly any technically relevant static friction, which means that in practice no axial compression or expansion of the thrust element becomes evident. The inner casing rests on the sliding film and in the event of a displacing operation it can be axially displaced over the sliding film with the exertion of negligible, or at least very little, force without the spontaneous occurrence of axial offset.

Advantageously, the sliding film is provided in a gap with the height of the gap being adjustable relative to the pressure and/or the volumetric flow of the operating medium. By adjustment, for example of the pressure of the operating medium with which the hydrostatic bearing is pressurized, the flow of the operating medium and thus the height of the gap can be set in a particularly simple and reliable manner. The pressure of the operating medium, and thus the height of the gap, can be appropriately matched to the bearing requirements depending on the mass of the inner casing to be displaced. The hydrostatic bearing, for example with a film of oil under pressure as an operating medium, in this case provides a particularly advantageous form of sliding bearing and is particularly suitable for a turbine system, which is relevant in this case, because the high sliding speeds required in principle for a possible hydrodynamic bearing of this kind are absent. All that is required is to make sure that the sliding film for the sliding bearing is maintained by a continuous supply of operating medium.

Advantageously, failure of the supply of the operating medium, e.g. a lubricant, can be certainly precluded over long periods by appropriate design of the hydrostatic bearing. Failure of the supply of the operating medium with unsteady component temperatures can, due to the gradually increasing build up of stress in the thrust element and associated deformation of the thrust element beyond design limits, lead to axial grazing of the turbine rotor against the inner casing and thus to serious damage. In an advantageous embodiment, this requirement can be very well met if the operating medium supply for the bearings of the shafting of the turbine system, that is present in any case and must meet high reliability requirements, is used for this purpose. Even after a short time, an interruption in the operating medium supply for the bearings of the shafting can in fact lead to serious damage to the steam turbine due to radial grazing.

In a preferred embodiment of the turbine system, the proposed hydrostatic sliding bearing should therefore use the existing operating and lubricant supply for the bearings of the shafting. In this way, both an easy axial displaceability of the inner casing and also an adequate operating safety of the turbine system are guaranteed.

In an alternative embodiment, for example where there are very different pressure requirements for the bearings, a separate operating medium supply in accordance with similarly high reliability criteria, as already previously discussed for the shafting, is to be provided for the supply of the hydrostatic bearing. With a separate supply system of this kind, any brief failures of the operating medium that might occur can be tolerated provided any associated sinking of the casing by the height of the sliding film lies within the radial play provided for the turbine system. The design principles based on bearing technology can therefore be used in a simple and known manner for designing a sliding bearing system using a hydrostatic bearing. The design of the sliding shoe, the supply with operating medium, the control of the volumetric flow and the avoidance of edge support can be achieved by applying these principles.

In a particularly advantageous embodiment, the bearing device has a rolling bearing with a number of rollers spaced apart along the direction of the axial displacement.

The use of a rolling bearing offers various possibilities, advantageously a bearing on cylindrical rollers or the use of multiple-ball bearings. The latter consists essentially of two plates between which a number of balls are located, that transmit the external loading, e.g. a normal force according to the principle of a parallel circuit. By the choice of material and matching the number and size of the rolling bodies, the load capacity of these bearing elements can be matched to the level of the forces to be transmitted for a turbine system. The load-bearing contact surfaces and their geometry are to be taken into account when designing the bearings, i.e. with balls, for example, there is a point contact instead of a line contact in the case of cylindrical rollers.

A rolling body has preferably a spherical or cylindrical geometry.

Where cylindrical rollers are used as the rolling body, a line contact results advantageously for each roller, that is better suited for the transmission of high forces than where balls with a point contact are used as the rolling body. The design criterion for the bearing is the relevant Herzian stress, determined by the shape of the contact partners, e.g. ball or cylinder against flat, relevant radii and materials of the contact partners (modulus of elasticity, transversal contraction coefficient). Because of the high forces a bearing has to support, which in the case of large solid turbine systems can, for example, be in the order of 100 kN up to approximately 500 kN, correspondingly large contact lengths and large radii of cylinders are required to keep the component stresses (e.g. Herzian stress) within permissible limits.

To achieve adequate high strength of the contact partners, the rolling bodies, e.g. the cylindrical rollers, can lie against separate high-tensile alloy plates that are in turn connected to the bearing partners, (e.g. inner casing and bearing housing or foundation). The high-tensile alloy plates form the contact surface to the rolling bodies at the same time, that take a normal force during a displacement operation. In this case several rollers can be arranged in parallel in an appropriate design, in order to achieve an additional contact length where the width is limited and thus increase the load capacity of the rolling bearing. Thus, by design measures it can be guaranteed that an essentially equal and uniform loading of the rollers is achieved even with a possible deformation of the casing of the turbine system.

Advantageously, a contact surface of the rolling body taking a normal force during a displacement operation has, at least locally, a geometry in the shape of a cylindrical jacket with a radius of curvature. The radius of curvature in this case can be specified according to the anticipated bearing loading. Therefore a geometry of the contact surface in the shape of a cylindrical jacket is sufficient to take a normal force. From the point of view of a possible efficient utilization of the limited installation space in the bearing area, rolling bodies can also be advantageously used in place of the complete cylindrical rollers, that by the omission of the side areas of the rollers not required to take a load enable a narrower arrangement of the rolling bodies. Where several rolling bodies are arranged in parallel, a suitable locating device, e.g. a cage can be used to fix the rolling body spacing, i.e. the spacings between the rotational axis of the rolling bodies.

Advantageously, the bearing includes a supporting arm of the inner casing and also a bearing support area, with the supporting arm being supported on the bearing support area by the bearing device. The supporting arm is thus advantageously a component of the inner casing and is permanently connected to it. The inner casing is therefore supported on the bearing support area by means of the supporting arm, with a slight axial displacement of the inner casing being achievable by the bearing device.

A particularly advantageous embodiment in this case is a coupling of the thrust element transmitting the axial force to the supporting arm. The axial displacing force can thus be transmitted from the thrust element, e.g. a trust rod, directly to the supporting arm and thus to the inner casing. For this, the bearing device is, for example, arranged between the supporting arm and the bearing support area, with the bearing device being designed with regard to a static friction coefficient which is as low as possible, so that the axial offset that spontaneously occurs in overcoming the static friction when the inner casing is displaced is less than a preset maximum value, in particular less than 2 mm.

In a further preferred embodiment, the bearing device has a lever that has a swiveling connection via the supporting arm to the bearing support area. For this purpose, for example, both the supporting arm and the bearing support area each have a pin that forms a swivel joint with the lever, with the length of the lever arm being determined by the spacing of the pins. By matching the pin diameter and lever length, a significantly lower friction moment can be set compared with the conventional bearing concepts using a sliding plate subject to friction. By realizing the bearing device using a pendulum support with a lever mechanism, a light axial displaceability of the inner casing can thus in combination with the thrust element transmitting the axial force be guaranteed while at the same time maintaining the permissible material stress.

Advantageously, no permanent supply with an operating medium is necessary with this design. With the lever design there are also few local points where the Herzian stress is high. The resetting force or retaining force that occurs during an axial displacement of the inner casing can be kept below a specified maximum value by an appropriate design of the lever mechanism with regard to the length of the lever arm and the pin diameter, so that at worst a negligible tolerable influence on the radial play results. The possible resulting reset or retaining force acting on the thrust element can advantageously be reduced to a very low value, so that undesirable deformations of the thrust element due to elastic extension or compression can be largely precluded.

Advantageously, the inner casing is connected to a damping device to dampen the vibrations. The damping device in this case can be designed as a hydraulic damping device to which hydraulic oil is applied in operation, or it can be a viscous friction damping system. The inner casing is, for example, connected via the damping device to the bearing support area so that possible vibrations introduced from the foundation into the bearing support area can be transmitted directly to the inner casing and do not directly, or only slightly, stress the thrust elements transmitting the axial force. Thus, the provision of the damping device advantageously enables transient forces, e.g. in areas with a high risk of earthquake, to be absorbed, with a high degree of operating safety being thus achieved also in such situations. The operation of the bearing device is, in combination with the damping device, thus guaranteed also in the event of a substantial transient shock stress, which is very advantageous particularly with large turbine systems with very heavy casings. In a particular manner, this design of the thrust element protects against transient stress and it can therefore perform its functions without limitation.

In a preferred embodiment of the turbine system, a medium-pressure steam turbine and at least two low-pressure turbine stages each having an inner casing are provided. The turbine stages are arranged along the main axis with the inner casing being connected to the thrust element and mounted in a bearing area having a bearing device.

Preferably, the medium-pressure stage of the steam turbine has an outer casing that is connected via a thrust element with the inner casing of the low-pressure stage of the steam turbine arranged in an axial direction, and with a fixed bearing connected to the outer casing forms the axial fixed point for a thermal axial expansion.

Preferably at least one of the low-pressure turbine stages has an exhaust steam casing with a diffusion area of 10.0 m$^2$ to 25 m$^2$, in particular of 12.5 m$^2$ to 16 m$^2$.

The turbine system is suited in a particular manner for design in the form of a steam turbine system. Particularly on steam turbine systems with low-pressure steam turbine stages very large diffusion areas can be realized in this way, such as are of significance for future steam turbine developments. The large inner casings of the turbine stages that can be realized in this way can be mounted using the system concept of the invention so as to be axially displaceable, with it being possible to employ the thrust elements for the transmission of the axial force for displacement without difficulty.

The invention furthermore enables the use of advantageous thrust elements, e.g. in the form of thrust rods, for compensating for the relative axial expansion between turbine rotors and inner casings of the turbine system.

The proposed solutions for the design of the bearing device with low static friction have the advantage that measures to reduce axial play that require a displacement of the inner casing, particularly the inner casing of low-pressure steam turbine sections can be more easily realized. Furthermore, the concept in accordance with the invention also enables the implementation of multi-casing turbine systems, e.g. with four low-pressure turbine stages, which enables the applications of existing turbine series to be increased.

BRIEF DESCRIPTION OF THE DRAWINGS

A turbine system is described in more detail in the following with the aid of drawings showing an exemplary embodiment. The drawings are as follows and are schematic and not to scale.

The same reference characters in the illustrations have the same meaning.

DETAILED DESCRIPTION OF INVENTION

Figure 1:
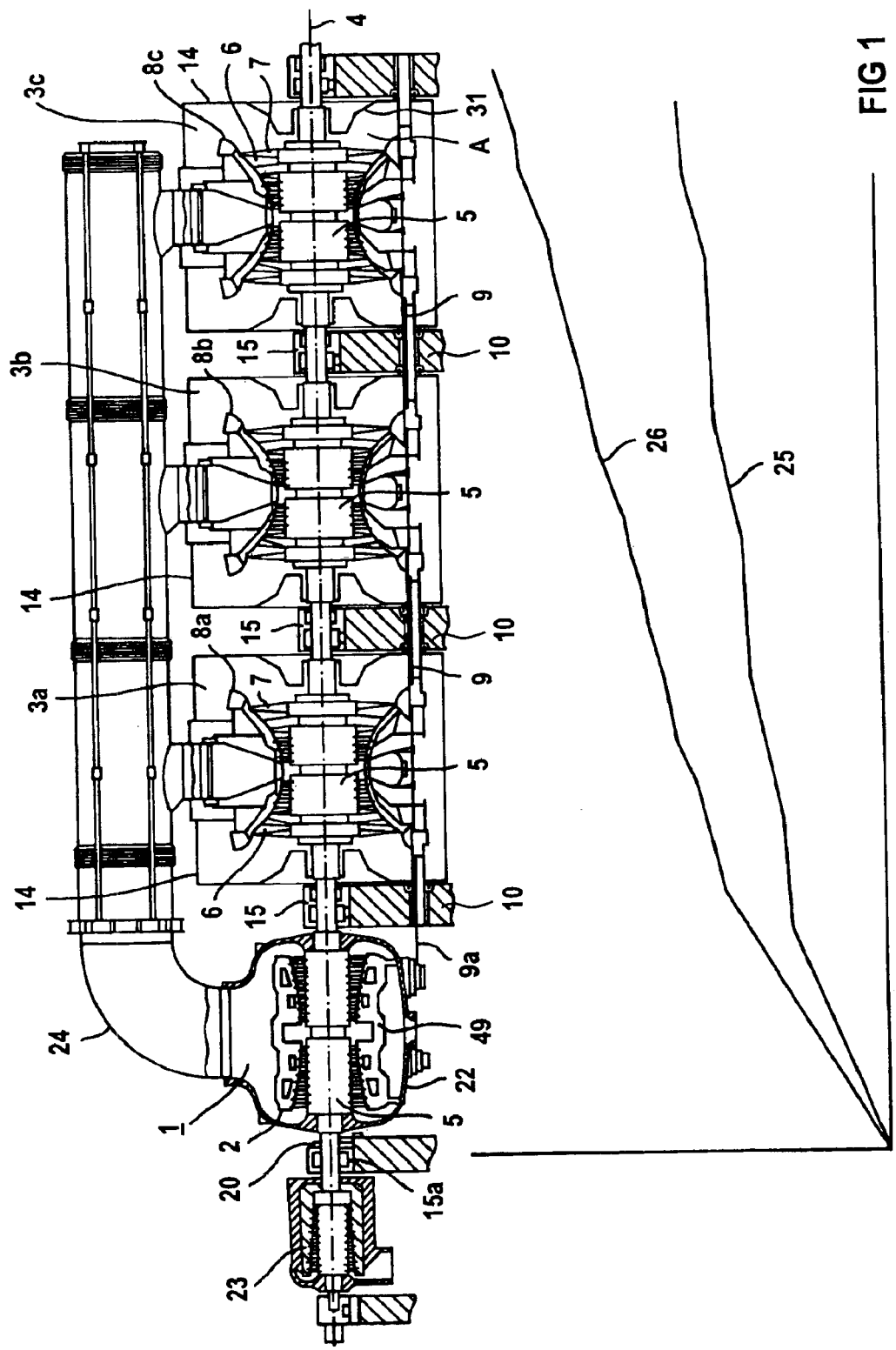
FIG. 1 A lengthwise section through a steam turbine system.

FIG. 1 is a steam turbine system 1 with a high-pressure steam turbine stage 23 arranged along a main axis 4, a medium-pressure steam turbine stage 2 and three low-pressure steam turbine stages 3a, 3b, 3c each essentially of similar construction. The low-pressure steam turbine stages 3a, 3b, 3c are connected with regard to flow to the medium-pressure steam turbine stage 2 by means of a steam supply 24. The medium-pressure steam turbine stage 2 has an outer casing 22. Each of the low-pressure steam turbine stages 3a, 3b, 3c has an inner casing 8a, 8b, 8c and an outer casing 14 enclosing the inner casing 8a, 8b, 8c. Each inner casing 8a, 8b, 8c carries the stationary blades 6 for low-pressure steam application. Furthermore, the low-pressure steam turbine stages 3a, 3b, 3c each have an exhaust steam casing 31 with a large diffusion area A, with the diffusion areas amounting to 10.0 m² to 25 m². Turbine rotors 5 extending along the main axis 4 are arranged in each inner casing 8a, 8b, 8c and carry the low-pressure rotor blades 7. The medium-pressure steam turbine stage 2 has an inner casing 49. A bearing area 10 is provided in each case between the medium-pressure steam turbine stage 2 and the first low-pressure steam turbine stage 3a, and between each of the adjacent low-pressure steam turbine stages 3a, 3b, 3c arranged in succession along the main axis 4. A bearing 15 is arranged in each bearing area 10. This bearing 15 serves both to mount the turbine rotors 5, i.e. as shaft bearings, and also to mount the particular inner casing 8a, 8b, 8c. A bearing 15a is also provided between the high-pressure steam turbine stage 23 and the medium-pressure steam turbine stage 2 to mount the turbine rotors of these turbine stages 2, 23. In the area of the mounting of the inner casing 8a, 8b, 8c of the particular bearing 15 a thrust element 9 for transmission of an axial force is arrange parallel to the main axis 4. The thrust element can, for example, be designed as a connecting rod 9a. A connecting rod 9a connects the medium-pressure steam turbine stage 2 with the first low-pressure steam turbine stage 3a and connects together the inner casing 8a, 8b, 8c, each adjacent to each other, of the low-pressure steam turbine stages 3a, 3b, 3c. The outer casing 22, the inner casing 8a, 8b, 8c and the thrust elements 9, 9a connecting these form an expansion assembly that expands in the direction of the main axis 4 when hot steam is applied.

The expansion assembly formed in this way has an axial fixed point 20 located at the fixed bearing 15a between the high-pressure steam turbine stage 23 and medium-pressure steam turbine stage 2. The size of the thermal expansion calculated from this fixed point 20 along the main axis 4 is shown by the expansion line 25 in the lower part of FIG. 1. A corresponding expansion line 26 of the turbine rotors 5 of the medium-pressure steam turbine stage 2 and the low-pressure steam turbine stages 3a, 3b, 3c, that are rigidly connected to each other, is also shown. By connecting the low-pressure steam turbine stages 3a, 3b, 3c to an expansion assembly in combination with the outer casing 22 of the medium-pressure steam turbine stage 2, the individual thermal expansions are used to axially displace the inner casing 8a, 8b, 8c along the main axis 4 in the direction of the generator (not illustrated in more detail). All the thermal expansions of the inner casing 8a, 8b, 8c are thus totaled along the main axis 4, which thus reduces the relative expansion of the turbine rotors 5 rigidly connected to each other. A comparison of the expansion lines 25 and 26 shows that a certain difference in expansion between the turbine rotors 5 and the inner casing 8c of the last low-pressure turbine stage 3c still remains over the complete length of the turbine system 1. This difference in expansion requires a different axial play between the stationary blades 6 and rotor blades 7 of each low-pressure steam turbine stage 3a, 3b, 3c.

Figure 2:
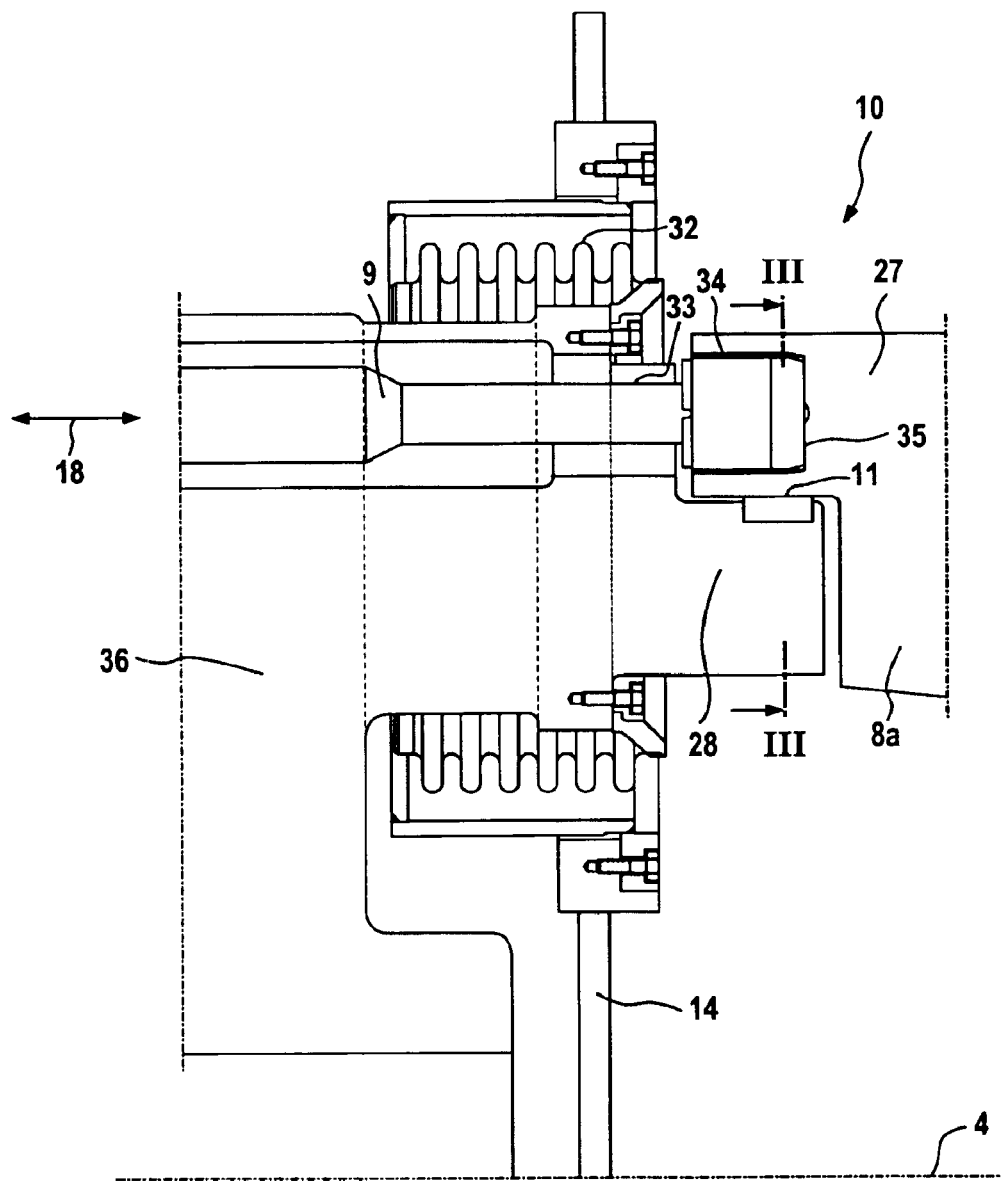
FIG. 2 A lengthwise section through a bearing area in which an inner casing is mounted so as to be axially displaceable.

FIG. 2 shows a section through bearing area 10 of the steam turbine system 1 shown in FIG. 1. The bearing area has a bearing casing 36 and also an inner casing 8a arranged along the main axis 4 and axially after the bearing area 36. The bearing casing 36 has a bearing support area 28 as well as a passage 33 to enable a vacuum-sealed passage of the thrust element 9. A supporting arm 27 that has a support 34 for the thrust element 9 is formed at the inner casing 8a. The inner casing 8a can be displaced by the thrust element 9 along an axial displacement direction 18, with the thrust element 9 transmitting an axial force via the supporting arm 27 to the inner casing 8a, essentially parallel to the main axis 4. For this purpose, the support 34 has a supporting surface 35 that serves as a reaction surface for support of the axial force transmitted by the thrust element 9. The support 34 with the supporting surface 35 is also known as a threaded blind hole. To achieve an easier axial displacement of the inner casing 8a, the bearing area 10 has a bearing device 11. The bearing device 11 in this case is arranged between the supporting arm 27 and the bearing support area 28. The supporting arm 27 is thus supported on the bearing support area 28 by means of the bearing device 11. The bearing device 11 is designed so that it has a static friction which is so small that the axial offset spontaneously occurring when overcoming the static friction on displacement of the inner casing 8a is less than 2 mm. The bearing device 11 in this case is, for example, designed to be free of static friction, which means that the permissible upper limit of an axial offset of 2 mm is certainly undershot. This largely avoids a spontaneous breakaway during an axial displacement operation. Furthermore the significant deformation of the thrust rod 9 that previously occurred with conventional bearing concepts and was evident as the static friction was overcome is now largely removed. For a vacuum-sealed guidance of the thrust element 9, a compensator 32, e.g. in the form of an expansion bellows, is arranged at the outer casing 14. The compensator 32 in this case also acts as a diaphragm seal that seals the vacuum space formed by the inner casing 8a and outer casing 14 and at the same time enables axial displacement along the direction of the displacement 18.

Figure 3:
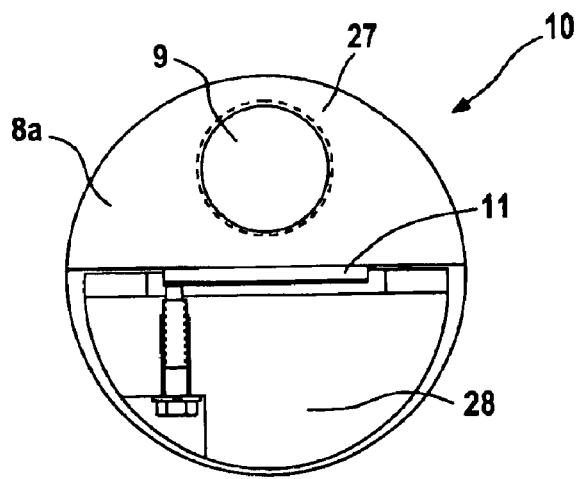
FIG. 3 A section view in accordance with section line III—III from FIG. 2.

The section view II–III of FIG. 2, shown in FIG. 3, is a detailed illustration of the bearing of the supporting arm 27 on the bearing support area 28 by means of the bearing device 11.

Figure 4:
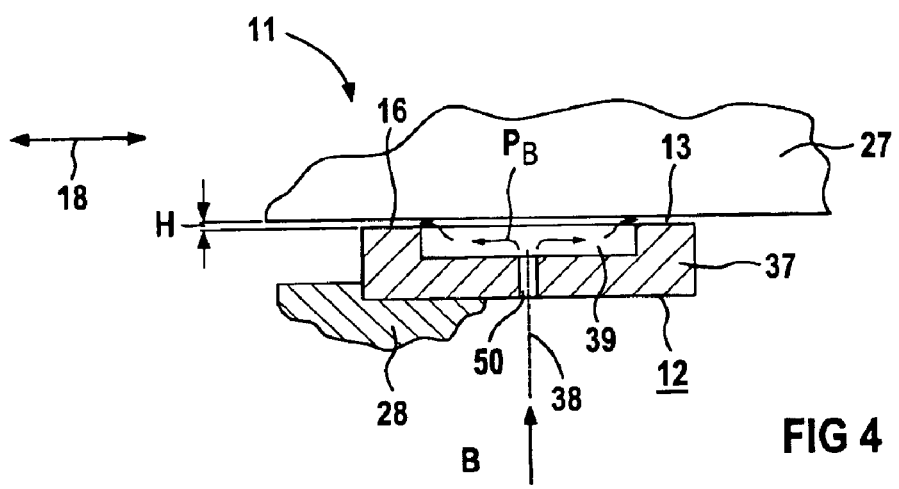
FIG. 4 A section view of an embodiment of the bearing device as a hydrostatic bearing.

Different designs of bearing device 11 are possible with regard to setting the lowest possible static friction to avoid spontaneously occurring axial offset. A particularly preferred possibility is shown in FIG. 4, where the bearing device 11 is a hydrostatic bearing 12. The hydrostatic bearing 12 is arranged between the supporting arm 27 and the bearing support area 28. The bearing 12 has a hydrostatic sliding shoe 37 with a supply 38 for an operating medium B, for example, oil under pressure. The hydrostatic sliding bearing 12 is supplied with the operating medium B when operating. For this purpose, the sliding shoe 37 has a supply opening 50 that opens into a pressure chamber 39 facing towards the supporting arm 27. The sliding shoe 37 is connected to the bearing support area 28, with the operating medium B being advantageously supplied via the bearing support area 28 to the hydrostatic bearing 12. When the bearing 12 is operating, operating medium B is provided under pressure $p_B$ to the pressure chamber 39. Due to the force exerted by the pressure, the supporting arm 27 is vertically raised relative to the sliding shoe 37, thus forming a gap 16. The gap 16 has a radial height H and extends between the sliding shoe 37 and supporting arm 27 along the axial direction of displacement 18. The height H of the gap 16 in this case can be set relative to the pressure $p_B$ with respect to the volumetric flow of the operating medium in the pressure chamber 39. The pressurizing of the pressure chamber 39 with the operating medium B causes a sliding film 13 to form in the gap 16, that is maintained by the continuous supply of operating medium B. Due to the sliding film 13 in the gap 16, a particularly easy axial displacement of the supporting arm 27 is achieved when an axial force is applied along the direction of displacement 18. Of particular significance is the fact that the embodiment of the bearing device 11 with the hydrostatic sliding bearing 12 is practically free of static friction.

Figure 5:
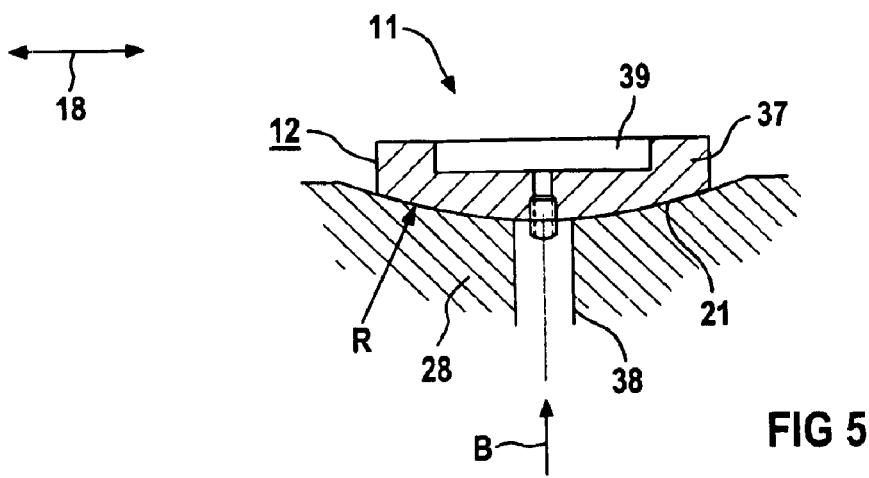
FIG. 5 An alternative embodiment of the hydrostatic bearing shown in FIG. 4.

An alternative embodiment of the hydrostatic sliding bearing 12 from FIG. 4 is shown in FIG. 5. In this case, the sliding shoe 37 has a curved contact surface 21 on the side facing the bearing support area 28, with a radius of curvature R being established. The bearing support area 28 is provided with the same radius of curvature R in the same manner. The contact surface 21 of the sliding shoe 37 lies firmly against the bearing support area 28. The contact surface 21 can in this case follow the geometry of a spherical cap or a cylindrical jacket cutout. For secure operation, the contact surface 21 can be supplied with a lubricant (not illustrated in detail), so that the sliding shoe and the bearing support area 28 are moveable relative to each other along the contact surface 21. This enables a slight sloping position or tilting of the sliding shoe 37 relative to the bearing support area 28 to be compensated for. Because the sliding shoe 27 can move, a very precise setting of the height H of the gap 16 when the sliding bearing 12 is operating is guaranteed.

Figure 6:
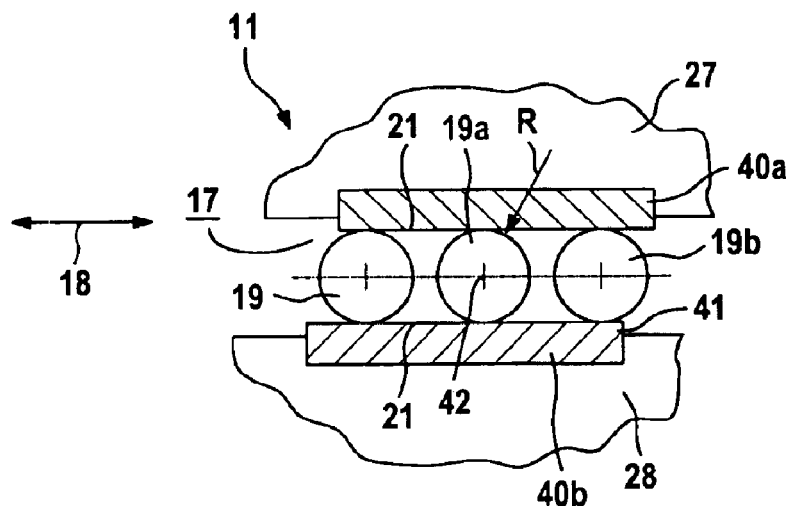
FIGS. 6 to 8 Each showing alternative embodiments of the bearing device in a rolling bearing, and FIG. 9 A bearing device having a lever mechanism.

FIG. 6 shows a bearing device 11 that has a rolling bearing 17. The rolling bearing 17 is arranged between the supporting arm 27 and the bearing support area 28. A plate-shaped contact element 40a is inserted into the supporting arm 27. A further contact element 40b is provided in the bearing support area 28. The contact elements 40a, 40b each have a contact surface 21 and consist of a high-strength material 41. Rolling bodies 19, 19a, 19b are arranged between the contact elements 40a, 40b, one behind the other parallel to the axial direction of displacement 18, and spaced apart. The rolling bodies 19, 19a, 19b each have an axis of rotation 42, about which the rolling bodies 19, 19a, 19b can each rotate. When the supporting arm 27 is displaced along the direction of displacement 18, the rolling bodies 19, 19a, 19b are set in a rolling motion due to the relative axial movement between the supporting arm 17 and the bearing support area 28. Because of the spherical or cylindrical shape of the geometry of the rolling bodies 19, 19a, 19b, only rolling friction occurs. On the other hand, with this bearing configuration practically no static friction occurs because a point of contact or line contact is present between the rolling bodies 19, 19a, 19b and the contact surfaces 40a, 40b. This means that a bearing device 11 with a rolling bearing 17 has a static friction that is so low that the axial offset spontaneously occurring when overcoming the static friction during the displacement of the supporting arm 27 is less than a preset maximum amount, for example less than 2 mm.

With an embodiment with cylindrical rollers as rolling bodies 19, 19a, 19b a line contact advantageously results that is particularly suitable for the transmission of very high forces. Because of the high forces that the rolling bearing 17 has to take, for example in the order of 100 kN to 500 kN, correspondingly large contact lengths between the rolling bodies 19, 19a, 19b and the contact surface 21 are required. Because of the shape of the contact partners, for example spherical or cylindrical, as rolling bodies 19, 19a, 19b against the flat contact surface 21, the radius of curvature R of the rolling bodies 19, 19a, 19b and the material of the contact partners (modulus of elasticity, transverse contraction coefficient), the rolling bearing 17 can be designed to take the stresses that occur. The use of a high-strength alloy as a material 41 is recommended for the contact elements 40a, 40b forming the contact surface 21.

Figure 7:
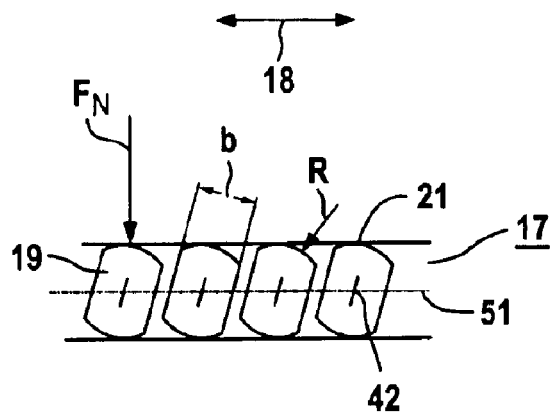
Figure 8:
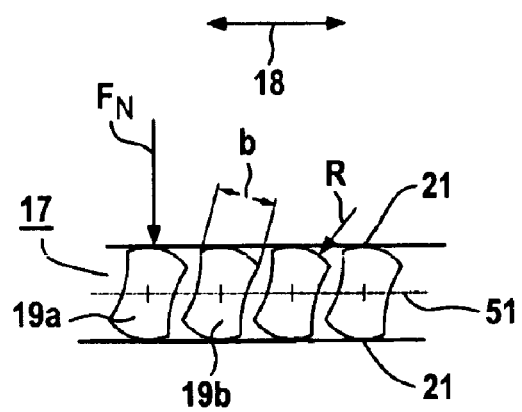

FIGS. 7 and 8 each show alternative embodiments of rolling bodies 19, 19a, 19b for the rolling bearing 17. The rolling bodies 19, 19a, 19b, have a cylindrical jacket-shaped geometry whereby the contact surface 21 of the rolling body 19, 19a, 19b that takes a normal force $F_N$ during a displacement operation has a radius of curvature R. The rolling bodies 19, 19a, 19b of FIGS. 7 and 8 are, however, designed with a smaller axial extension b than a rolling body 19 (see FIG. 6) designed completely as a cylindrical roller. The side areas of the rolling bodies 19, 19a, 19b not used for rolling during an axial displacement operation were deliberately omitted. The rolling bodies 19, 19a, 19b have a symmetrical shape relative to a mid plane 51. The design of the rolling bodies 19, 19a, 19b with a reduced axial extension b enables a closer arrangement of the rolling bodies 19, 19a, 19b along the direction of displacement 18. This means that more rolling bodies 19, 19a, 19b per unit of length can be arranged in the rolling bearing 17 compared with the configuration shown in FIG. 6, which leads to a correspondingly increased load capacity of the rolling bearing 17.

Figure 9:
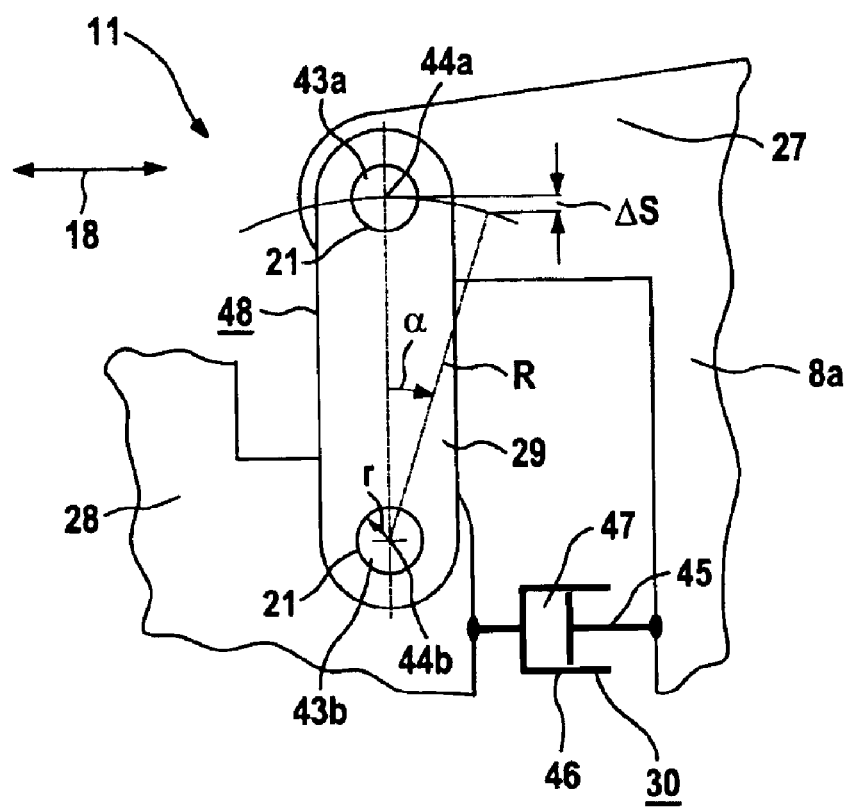

FIG. 9 is an exemplary embodiment of the bearing device 11 where the bearing device 11 has a lever 29 through which the supporting arm 27 has a swiveling connection to the bearing support area 28. For this, the supporting arm 27 has a pin 43a and the bearing support area 28 has a pin 43b. The pins 43a, 43b provide a swiveling support for the lever 29, so that the pins 43a, 43b and the lever 29 are in contact along a contact surface 21 that is essentially shaped like a cylindrical jacket and an axis of rotation 44a, 44b is formed in each case. The contact surface 21 in this case is formed by the pins 43a, 43b, with a pin radius r being provided. The lever 29 has a lever length R that also corresponds to a radius of curvature R relative to the axis of rotation 44b assigned to the pin 43b. The supporting arm 27 of the inner casing 8a is supported on the bearing support area 28 by means of the bearing device 11 with the lever 29. If an axial displacement takes place along the direction of displacement 18, the lever 29 is rotated by an angle of rotation α relative to a vertical direction. Because of the swiveling connection, an axial displacement is therefore connected with a vertical lift ΔS, by means of which the inner casing 8a is also displaced in a radial direction relative to the bearing support area 28. Depending on the length R of the lever 29, the vertical lift ΔS can be limited to a small preset value. Because the supporting arm 27 is supported via the lever 29 on the bearing support area 28 a pendulum support bearing 48 is realized that enables a slight axial displacement of the inner casing 8a by using a thrust element 9 (not shown in more detail in FIG. 9), whereby a large mass of the inner casing 8a can be displaceably supported.

To additionally increase the operating safety, a damping device 30 is connected to the inner casing 8a to dampen vibrations. The damping device 30 is designed as a hydraulic damping device and for this has a ram 45 together with a hydraulic cylinder 46 housing the ram 45. For operation, the damping device 30 is supplied with a damping fluid 47, e.g. hydraulic oil. By the combination of the bearing device 11 with a damping device 30 a high operating safety is advantageously guaranteed, in particular the damping device 30 is designed to take short transient forces, for example the shock stress due to earthquakes. The damping device 30 directly transfers any vibration from the bearing support area 28 that, for example, is connected to a foundation (not illustrated). The damping device thus avoids a force being introduced into the thrust element due to vibration and enables any strong vibrations (e.g. earthquakes) from the thrust elements to the inner casing 8a to be avoided as far as possible. For this purpose, the damping device 30 is connected, directly or indirectly, both to the inner housing 8a and also to the bearing support area 28.

By means of the invention, a particularly advantageous design for an inner casing of a turbine system that can be easily axially displaced is provided. An application for large, solid multi-casing turbine systems, e.g. steam turbine systems with exhaust steam casings with large diffusion areas of 10.0 m² up to 25 m² is possible with the concept of a thrust element transmitting an axial force being used for axial displacement. The deformation of the thrust element that influences the axial play can at the same time be substantially reduced or completely removed. In addition to relieving the stress on the structure by means of a thrust element, further measures to reduce axial play, e.g. lever transmission of the expansion, are possible. Compared with the previously known bearing concepts with a sliding plate subject to friction (sliding fit), the invention achieves a distinctly improved bearing system for a turbine system, with the axial displacement of very heavy casings being achieved by displacing using a thrust element. The turbine system of the invention with the bearing device with a low static friction enables different bearing designs to be combined with a thrust-transmitting thrust element, e.g. a thrust rod.

What is claimed is:

1. A turbine system, comprising:
at least two turbine stages, each of the turbine stages having a turbine rotor extending along a main axis, the turbine rotors rigidly connected to each other and one of the turbine stages having an inner casing enclosing the turbine rotor, the inner casing supported in a bearing area so that it can be axially displaced;
an outer casing enclosing the inner casing, the outer casing separate from the inner casing;
a thrust element for transmitting an axial force for an axial displacement connected to the inner casing; and
a bearing device located in the bearing area adapted to provide reduced static friction such that an axial offset that spontaneously occurs when the static friction is overcome when displacing the inner casing is less than 2 mm.

2. A turbine system in accordance with claim 1, wherein the bearing device is free of static friction.

3. A turbine system in accordance with claim 2, wherein the bearing device has a hydrostatic bearing that is supplied with a pressurized operating means, whereby a sliding film is formed.

4. A turbine system in accordance with claim 2, wherein the bearing device is a rolling bearing with an number of rolling bodies arranged along the axial direction of displacement relative to each other.

5. A turbine system in accordance with claim 2, wherein the bearing area has a supporting arm of the inner casing and a bearing support area, with the supporting arm being supported on the bearing support area by means of the bearing device.

6. A turbine system in accordance with claim 2, wherein one medium-pressure steam turbine stage and at least two low-pressure steam turbine stages each having an inner casing are provided, with the turbine stages being arranged along the main axis, with the inner casing being connected to the thrust element and supported in a bearing area with a bearing device.

7. A turbine system in accordance with claim 1, wherein the bearing device hydrostatic bearing that is supplied with a pressurized operating means, whereby a sliding film formed.

8. A turbine system in accordance with claim 7, wherein the sliding film is provided in a gap, with the height of the gap being adjustable relative to the pressure of the operating means.

9. A turbine system in accordance with claim 7, wherein the bearing device is a rolling bearing with an number of rolling bodies arranged along the axial direction of displacement relative to each other.

10. A turbine system in accordance with claim 7, wherein the pressurized operating means is oil under pressure.

11. A turbine system in accordance with claim 1, wherein the bearing device is a rolling bearing with an number of rolling bodies arranged along the axial direction of displacement relative to each other.

12. A turbine system in accordance claim 11, wherein a contact surface of the rolling body taking a normal force $F_N$ during a displacement operation has a cylindrical jacket-shaped geometry with a radius of curvature R.

13. A turbine system in accordance with claim 11, wherein a rolling body has a spherical or cylindrical geometry.

14. A turbine system in accordance with claim 1, wherein the bearing area has a supporting arm of the inner casing and a bearing support area, the supporting arm being supported on the bearing support area by the bearing device.

15. A turbine system in accordance with claim 14, wherein the bearing device has a lever by which the supporting arm has a swiveling connection to the bearing support area.

16. A turbine system in accordance with claim 14, wherein the inner casing is connected to a damping device to dampen vibrations.

17. A turbine system in accordance with claim 1, wherein one medium-pressure steam turbine stage and at least two low-pressure steam turbine stages each having an inner casing are provided, with the turbine stages being arranged along the main axis, with the inner casing being connected to the thrust element and supported in a bearing area with a bearing device.

18. A turbine system in accordance with claim 17, wherein the medium-pressure steam turbine stage has an outer casing that is connected via a thrust element to the inner housing of the low-pressure steam turbine stage arranged downstream in an axial direction, and a fixed bearing connected to the outer casing that forms the axial fixed point for a thermal axial expansion.

19. A turbine system in accordance with claim 17, wherein one of the low-pressure steam turbine stages has an exhaust steam casing with a diffusion area of 10.0 m$^2$ to 25 m$^2$.

20. A turbine system in accordance with claim 1, wherein the turbine system is a steam turbine system.

* * * * *